United States Patent [19]
Knoedler et al.

[11] Patent Number: 5,210,532
[45] Date of Patent: May 11, 1993

[54] BABY MONITOR RECEIVER HAVING INDICATOR DISPLAY AND DUAL POSITION CLIP

[75] Inventors: Roy E. Knoedler; Ted F. Kelley, both of Boulder; Jack W. Renforth, Aurora, all of Colo.

[73] Assignee: Gerry Baby Products Company, Denver, Colo.

[21] Appl. No.: 753,718

[22] Filed: Sep. 3, 1991

[51] Int. Cl.⁵ .................. G08B 7/06; G08B 5/22; G08B 5/36; H04B 1/08
[52] U.S. Cl. .................. 340/825.69; 340/825.72; 340/815.03; 340/573; 455/90; 455/159.2; 455/347; 455/351; 361/417; 379/174; 379/430; 379/454; 248/126; 224/242; 224/252; 224/269; D14/188; D14/192; D14/197
[58] Field of Search .................. 340/762, 782, 815.03, 340/825.69, 825.72, 573; 455/67.7, 89, 90, 157.2, 159.1, 159.2, 347, 351; D14/137–140, 155, 159, 188–193, 197, 198, 248–253; D21/111; D10/104, 106, 109; 361/380, 392, 417, 419, 422, 427; 446/26, 175; 379/174, 446–450, 454–457, 430; 248/126, 691, 692, 231.8, 316.7; 224/197, 242, 245, 252, 254, 269

[56] References Cited

U.S. PATENT DOCUMENTS

| | | | |
|---|---|---|---|
| D. 283,816 | 5/1986 | Cutler | D14/68 |
| D. 283,892 | 5/1986 | Cutler | D14/68 |
| D. 310,218 | 8/1990 | Murphy | D14/137 |
| D. 310,664 | 9/1990 | Murphy | D14/137 |
| D. 312,222 | 11/1990 | Sawyer | D14/159 |
| D. 323,826 | 2/1992 | Suzuki et al. | D14/137 |
| 3,906,345 | 9/1975 | Bertolasi | 340/815.03 |
| 4,136,344 | 1/1979 | Nakao et al. | 455/347 |
| 4,598,272 | 7/1986 | Cox | 340/825.49 |
| 4,654,629 | 3/1987 | Bezos et al. | 340/782 |
| 4,785,291 | 11/1988 | Hawthorne | 340/815.03 |
| 4,802,241 | 1/1989 | Vickers et al. | 224/197 |
| 4,828,153 | 5/1989 | Guzik et al. | 224/242 |
| 5,054,672 | 10/1991 | Weissman | 224/254 |
| 5,068,652 | 11/1991 | Kobayashi | 340/762 |

*Primary Examiner*—Donald J. Yusko
*Assistant Examiner*—Andrew M. Hill
*Attorney, Agent, or Firm*—Biebel & French

[57] ABSTRACT

A baby monitor receiver is provided for use in combination with a transmitter unit. The receiver includes a plurality of LED's positioned along the front upper edge of a housing for providing a visual indication of signals received by the receiver. The LED display is positioned such that they may be easily viewed from a variety of locations relative to the housing of the receiver and ranging from a location directly in front of the receiver to a location directly above the receiver. In addition, a clip member is provided on a rear portion of the housing for supporting the receiver from a person's belt as well as for acting as a leg to support the housing in an upright position.

17 Claims, 5 Drawing Sheets

BABY MONITOR RECEIVER HAVING INDICATOR DISPLAY AND DUAL POSITION CLIP

BACKGROUND OF THE INVENTION

The present invention relates to a baby monitor and, more particularly, to a receiver for use in combination with a transmitter to monitor the sounds made by a baby.

Baby monitors are increasingly used by parents to monitor a baby while the parent goes to a different location away from the baby such as a different room or outside of the house while the baby is sleeping. The typical baby monitor includes a transmitter or baby unit and a receiver or parent unit wherein the baby unit transmits sounds from the baby to the parent unit and, in some monitoring systems, the parent unit may also transmit the parent's voice to the baby unit.

In known prior art baby monitoring units, the unit is designed to lay flat on its back on a table or in some instances, may also be mounted to a wall. Further, it is known to provide the baby and parent unit with volume adjustment knobs whereby the sound being transmitted by the baby unit must be above a certain level, and the loudness of the sound emitted by the parent unit may be controlled.

It is also known to provide an LED display such that the audio transmission on the parent unit may be shut off and a series of LED lights will light up on the planar front face of the parent unit wherein the number of LED lights displayed will correspond to the loudness of the sound being transmitted by the baby unit.

In the use of prior art baby monitoring systems, there has been a need for a parent unit having an LED display in which the display may be viewed from various angles by the parent when the unit is either being carried, such as on a belt or when the unit is resting on the table.

SUMMARY OF THE INVENTION

The present invention provides a receiver for use in monitoring a baby, which receiver may be used in combination with a transmitter. The receiver includes a housing defined by front and rear sides which are connected by upper and lower edges and opposing first and second lateral edges.

The upper edge is formed having an arcuate shape and a groove is formed along the upper edge adjacent to the front side. A series of light emitting diodes or LED's are positioned within the groove in spaced relationship to each other and across substantially the entire extent of the upper edge.

A lens portion is positioned over the LED's and the groove and includes arcuate longitudinal edges extending substantially parallel to the shape of the upper edge wherein one of the longitudinal edges is positioned adjacent to the front side and the other longitudinal edge is positioned adjacent to the upper edge. The groove and covering lens portion are formed such that light emitted by the diodes will travel in a first direction perpendicular to a plane defined by the front side and in a direction parallel to the plane defined by the front side as well as in directions intermediate the first and second directions. Thus, a person may view the LED lights from either an angle directly above the upper edge of the housing or from an angle substantially horizontally spaced from the front side of the housing, or from any angle intermediate these two angles.

A clip member is also provided pivotally mounted to the rear side of the housing wherein the clip member may be used to attach the receiver unit to a person's belt being worn around the person's waist, or the clip may be rotated around 180° to form a leg acting in combination with the lower housing edge to support the housing in a substantially upright position.

It is therefore an object of the present invention to provide a receiver for a baby monitor which may be supported from either a belt or propped up on a table, as well as rested on a back surface of the receiver.

It is a further object of the invention to provide a series of LED lights which are displayed in response to a signal received by the receiver whereby a visual indication of the signal is provided.

It is yet another object of the invention to provide an LED display which may be viewed from a variety of directions.

Other objects and advantages of the invention will be apparent from the following description, the accompanying drawings, and the appended claims.

DETAILED DESCRIPTION OF THE PREFERRED EMBODIMENTS

Figure 1:
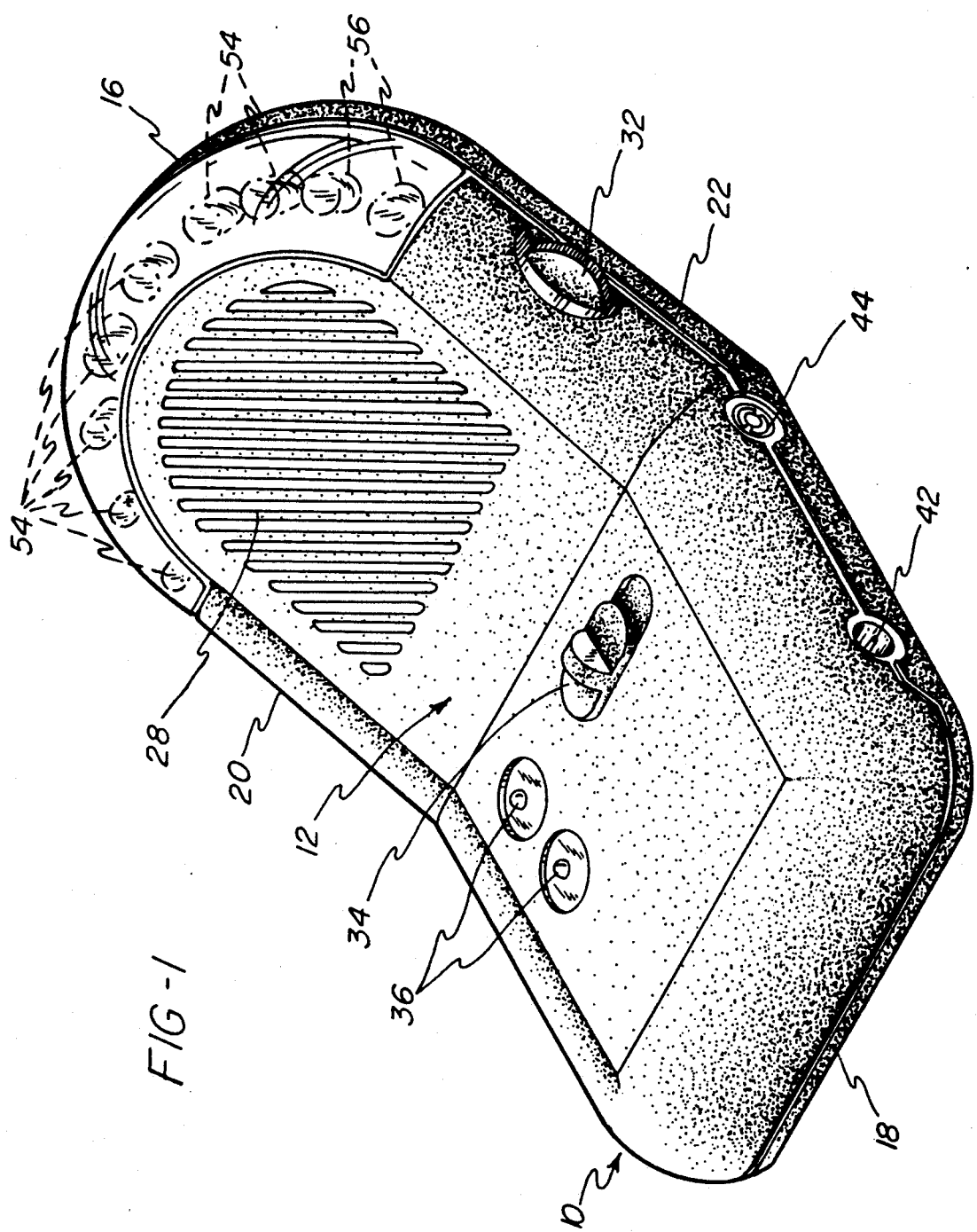
FIG. 1 is a perspective view of the present invention.
Figure 2:
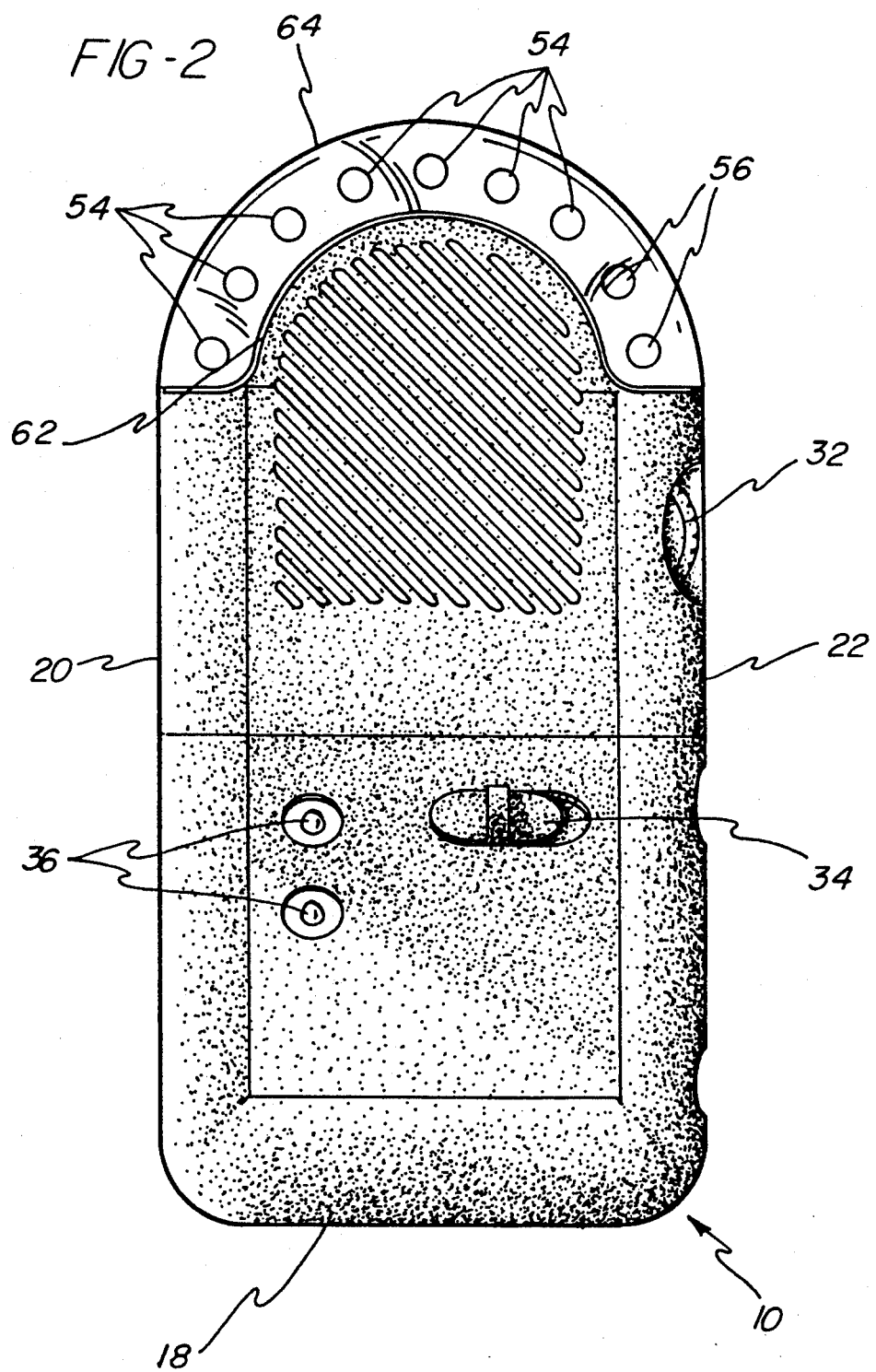
FIG. 2 is a front elevational view of the present invention.
Figure 3:
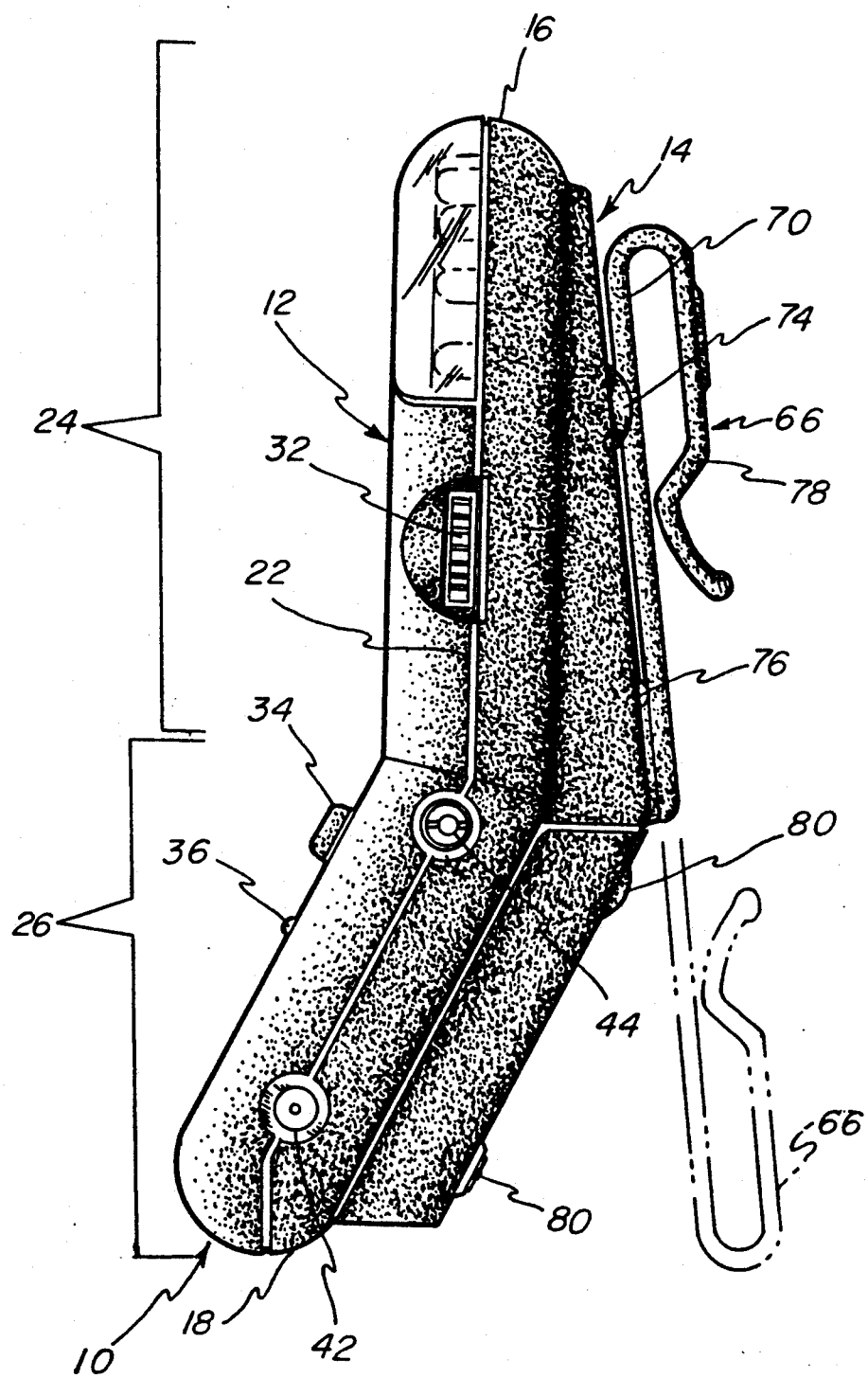
FIG. 3 is a side elevational view shown in partial cross-section.

Referring to FIGS. 1-3, the receiver of the present invention includes a housing 10 having a front side 12, a rear side 14, opposing upper and lower edges 16, 18 and opposing first and second lateral edges 20, 22 wherein the edges 16, 18, 20, 22 connect the front and rear sides 12, 14.

It should be noted that the upper edge 16 is formed having an arcuate shape which extends between the first and second lateral edges 20, 22. Further, as seen in FIG. 3, the housing 10 is divided into an upper portion 24 and a lower portion 26 wherein the upper and lower portions 24, 26 are disposed at an obtuse angle relative to each other, which angle is preferably approximately 153°.

The upper portion 24 on the front face 12 thereof includes a grid or grill area 28 behind which is located a speaker 30 (see FIG. 4) for emitting audible sounds in response to signals received from a transmitter unit. The volume of the audible signal emitted by the speaker 30 may be controlled by a volume control knob 32 located on the side of the upper housing portion 24.

The lower housing 26 includes a switch 34 for turning the unit on and off as well as for permitting the speaker 30 to be turned off while the unit remains on in a muted mode of operation wherein only a visual indication of the signal received will be indicated by the unit, as is described further below. In addition, a pair of LED's 36 are provided on the front face 12 at the lower portion 26 for indicating that the unit is on as well as for indicating when the unit is out of the range of the transmitter.

Figure 4:
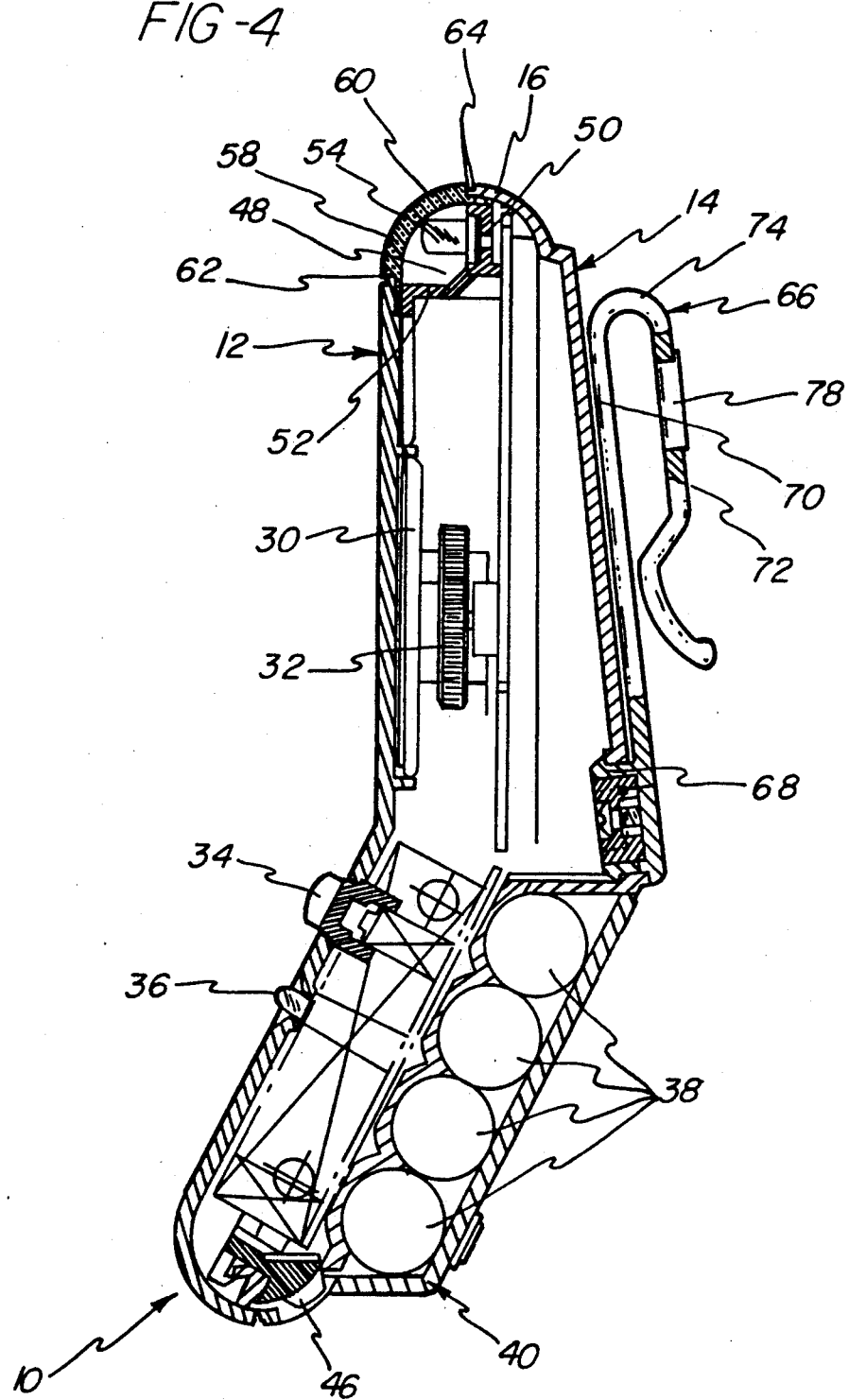
FIG. 4 is a side elevational view showing an alternative position for the clip member in phantom lines.

In most instances, the unit will be used as a portable unit and therefore will be powered by a plurality of AA batteries 38 located in a battery compartment 40, as may be seen in FIG. 4. However, when it is desired to use the unit for an extended period of time in a stationary position, such as when the unit is rested on a table top or hung on a wall, a plug 42 is provided whereby power may be obtained from a conventional AC wall outlet. An additional plug 44 is provided for providing a direct wire connection between the receiver of the present invention and a transmitter unit. Such a direct wire connection might be utilized when the unit is used as a monitor between rooms within a house where portability of the transmitter and receiver units is not a concern.

A further switch 46 (see FIG. 4) is provided adjacent to the lower edge 18. The switch 46 may be used to change the operating channel for the unit between two preset FM channels such that a channel which provides the optimum reception may be selected for use.

The lower housing portion 26 also carries the necessary electronic components for processing signals received from a transmitter unit working in combination with a receiver. The electronic circuitry used is generally well-known in the art and the specifics of the circuitry for receiving and processing the signals received do not form any part of the present invention.

Referring to FIGS. 2 and 4, the upper edge 16 of the housing 10 is formed with an arcuate groove 48 extending parallel to the arcuate upper edge 16 between the opposing first and second lateral edges 20, 22 and adjacent to the front side 12. The groove 48 includes at least a first wall 50 extending substantially parallel to the front side 12 and a second wall 52 extending substantially perpendicular to the front wall 12.

As may be seen in FIG. 2, a plurality of light emitting diodes or LED's 54, 56 are located within the groove 48 and are spaced substantially uniformly from each other across the entire extent of the upper edge 16. The LED's 54, 56 provide a visual indication of the processed signal used to drive the speaker 30. Further, the number of LED's 54, 56 that are illuminated will vary depending on the strength of the signal, with the LED's 54 located at the left side, as seen in FIG. 2, being illuminated first and sequentially progressing to the LED's 56 located at the right side. In other words, as the strength of the signal or loudness of the sound emitted by the speaker 30 increases, the number of LED's 54, 56 illuminated will also increase.

In order to obtain the progressive lighting of the LED's 54, 56, the receiver of the present invention incorporates a National semi-conductor chip Model No. LM3914 manufactured by National Semi-Conductor Corp. of Santa Clara, Calif. which chip takes the signal provided for the audio output and processes it to progressively light the LED's 54, 56 depending on the strength of the signal.

In addition, it should be noted that the LED's 54 are preferably green and the LED's 56 are preferably red such that it is possible to quickly identify when an extremely loud signal is being transmitted such that the red LED's 56 are illuminated. This is particularly useful when the receiver is placed in the muted mode of operation such that the speaker 30 is disabled and only the visual output provided by the LED's 54, 56 may be detected.

Referring again to FIG. 4, the groove 48 and LED's 54, 56 are covered by a plastic lens portion 58 which is preferably darkened so that it has a substantially opaque appearance except when the LED's 54, 56 are illuminated at which time spots of light created by the LED's 54, 56 may be clearly seen through the outer surface 60 of the lens portion 58.

The lens portion 58 is formed having an arcuate cross-section curving from a first longitudinal edge 62 adjacent to the front face 12 to a second longitudinal edge 64 adjacent to the upper edge 16. As is apparent from the drawings, the outer surface 60 of the lens portion 58 curves from the first edge 62 at which a plane tangent to the surface 60 is parallel to the front side 12 and extends to the second edge 64 at which a plane tangent to the outer surface 60 meets a plane tangent to the upper edge 16 and is perpendicular to the front side 12.

Thus, a person using the receiver of the present invention may view the display provided by the LED's 54, 56 from a first direction perpendicular to a plane defined by the front face 12 or from a second direction which is parallel to the plane defined by the first side 12, as well as any direction which is intermediate these two directions. Such a lens construction provides a particular advantage for a parent using the receiver unit when the receiver unit is hanging from a belt around the waist of the parent since the parent may easily look down to periodically check the LED display to see if a baby located near a transmitter unit is crying or making some other sounds. This is also particularly useful in instances where a parent with the receiver unit attached to his or her belt is operating an appliance such as vacuum cleaner which may drown out the sounds of a baby crying whether or not the audio speaker 30 for the unit is muted.

In order to facilitate carrying the unit on a belt, a clip member 66 is attached to the housing 10 by a pivot connection 68 which permits the clip 66 to pivot in a plane substantially parallel to the rear side 14 through at least 180° of movement. The clip member 66 includes first and second leg portions 70, 72 joined by an arcuate portion 74. When the clip member is in the position shown in FIG. 4, it may be hung on a belt on the waist of a person for easy transportation of the unit as the person moves to different locations. As may be seen in FIG. 5, a pair of protrusions 74 extend from the rear side 14 for engaging either side of the leg 70 and thereby temporarily resist pivotal movement of the clip member 66.

Figure 5:
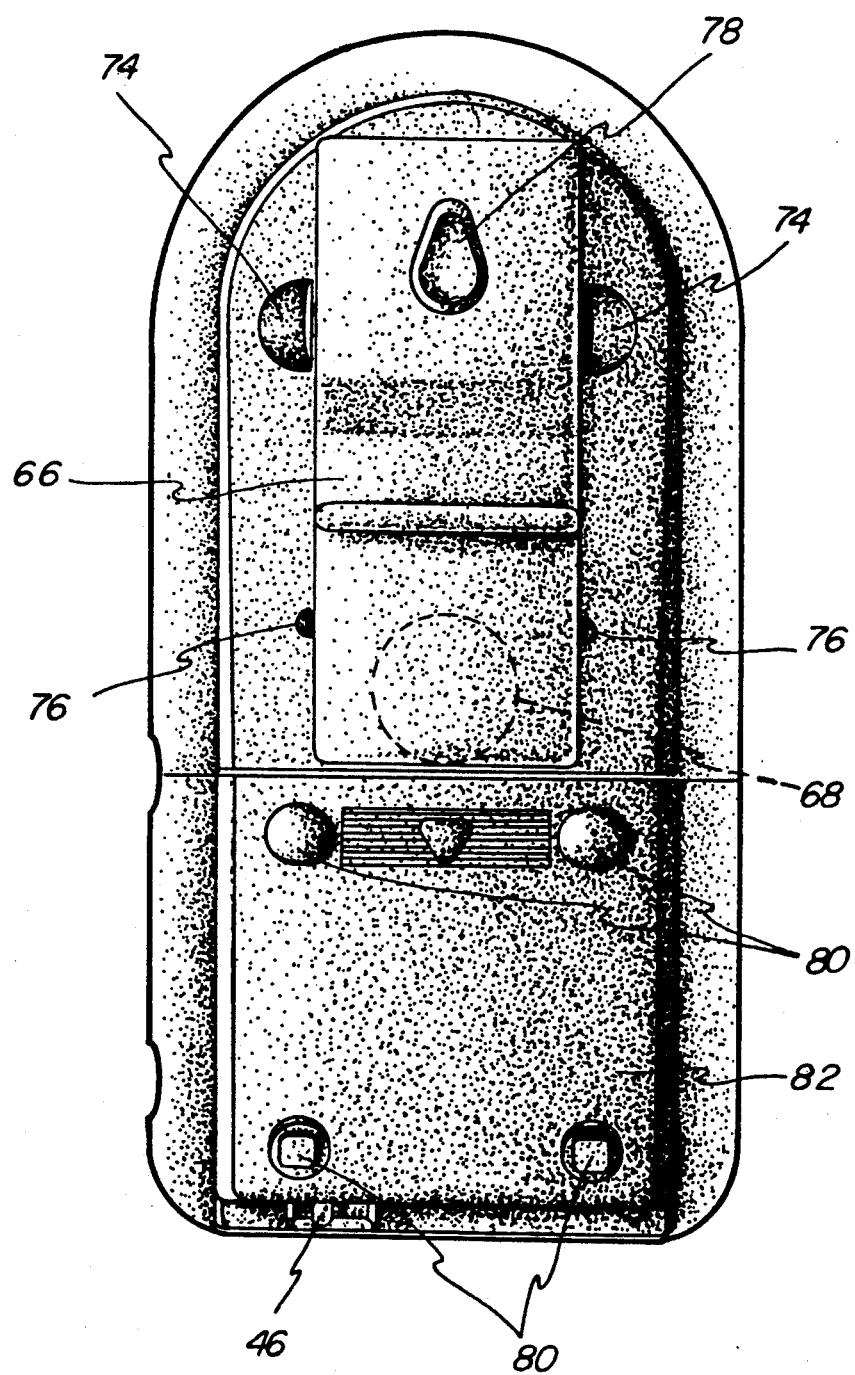
FIG. 5 is a rear elevational view.

As may be seen in FIG. 3, the clip member 66 may be forced past the protrusions 74 and pivoted around 180° to form a support leg in which the arcuate portion 74 cooperates with the lower edge 18 to support the housing 10 with the upper portion 24 in a substantially upright position when the monitor is placed on a horizontal surface. Referring to FIG. 5, the clip member 66 may be maintained in the position shown in phantom lines in FIG. 3 by means of additional protrusions 76 similar to the protrusions 74.

FIG. 5 also illustrates alternative means for supporting the housing 10 including an aperture 78 formed in the leg portion 72 of the clip member 66 whereby the receiver may be hung from a fastener extending from a wall surface. In addition, a plurality of pads 80 are located on a cover portion 82 for the battery compartment whereby the housing 10 may be placed with the battery compartment door 82 aligned substantially parallel to a horizontal surface, in which case the batteries 38 act to weight the lower housing portion 26 for preventing pivotal movement of the housing 10 with the lower portion 26 pivoting upwardly.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A receiver for use in monitoring a baby, said receiver comprising:
   a housing defining front and rear sides,
   opposing upper and lower edges and opposing first and second lateral edges connecting said front and rear sides,
   means defining a groove in said upper edge adjacent to said front side,
   a plurality of light emitting diodes located within said groove,
   said groove being formed such that light emitted from said diodes will be transmitted from said housing in a first direction perpendicular to a plane defined by said front side and in a second direction parallel to said plane defined by said front side,
   a clip member and pivot means connecting said clip member to said rear side for pivotal movement to move said clip member from a first position with an edge of said clip member adjacent an upper end of said housing to a second position with said edge of said clip member adjacent a lower end of said housing, and
   wherein said clip member, in said first position, is adapted to be attached to a belt worn on the waist of a person to locate said front side in a substantially vertical position, and said clip member, in said second position, forms a support leg extending in angular relationship to a portion of said rear side with said edge of said clip member located in spaced relation to said lower edge of said housing such that said edge of said clip member and said lower edge of said housing are positioned to engage a horizontal surface to support said housing with said front side in a substantially vertical position.

2. The receiver of claim 1, including a lens portion extending over said groove, said lens portion including an outer surface and opposing first and second longitudinal edges, wherein a plane tangential to said outer surface adjacent to first longitudinal edge lies substantially perpendicular to a plane tangential to said outer surface adjacent to said second longitudinal edge.

3. The receiver of claim 2, wherein said first and second longitudinal edges extend from said first lateral edge to said second lateral edge.

4. The receiver of claim 2, wherein said lens portion between said first and second longitudinal edges defines an arcuate cross-section.

5. The receiver of claim 1, including a lens portion extending over said groove wherein said upper edge defines an arcuate shape and said lens portion includes opposing first and second longitudinal edges, said first and second longitudinal edges extending parallel to said arcuate upper edge from said first to said second lateral edge.

6. A receiver for use in monitoring a baby, said receiving comprising:
   a housing defining front and rear sides,
   opposing upper and lower edges and opposing first and second lateral sides connecting said front and rear sides,
   upper and lower housing portions located adjacent to said upper and lower edges, respectively, said upper and lower housing portions defining upper and lower non-parallel rear side portions,
   a clip member including first and second legs and an arcuate portion joining said legs, and
   pivot means connecting said clip member to said upper rear side portion, said clip member being pivotable about said pivot means to a first position wherein said clip member extends substantially adjacent to said upper rear side portion such that said legs and said arcuate portion are located to engage a belt worn on the waist of a person to support said receiver, and a second position wherein said clip member extends substantially adjacent and at an angle to said lower rear side portion such that said arcuate portion and said lower edge of said housing are located to engage a horizontal surface to support said upper portion in a substantially vertical position.

7. The receiver of claim 6, including protrusions formed on said rear side for cooperatively engaging with said clip member to define said first and second positions.

8. The receiver of claim 6, including means defining an aperture in said clip member whereby said receiver may be hung on a fastener extending through said aperture.

9. The receiver of claim 6, including means defining a groove formed in said upper edge adjacent to said front side and a plurality of light emitting diodes located within said groove, wherein said groove is formed such that light emitted from said diodes will be transmitted from said housing in a first direction perpendicular to a plane defined by said front side and in a second direction parallel to a plane defined by said front side.

10. The receiver of claim 6, wherein said upper and lower housing portions are disposed at an obtuse angle relative to each other.

11. The receiver of claim 10, including a battery compartment formed in said lower housing portion for receiving a plurality of double A size batteries.

12. A receiver for use in monitoring a baby, said receiver comprising:
    a housing defining front and rear sides,
    opposing upper and lower edges and opposing first and second lateral edges connecting said front and rear sides,
    upper and lower housing portions located to said upper and lower edges, respectively, said upper and lower portions being disposed at an obtuse angle relative to each other,
    said upper edge defining an arcuate shape and including means defining a groove adjacent to said front side,
    a plurality of light emitting diodes located within said groove and spaced substantially uniformly across said arcuate upper edge for being sequentially illuminated to indicate the strength of a signal received by said receiver,
    a lens portion covering said groove, said lens portion having opposing first and second longitudinal edges and defining an arcuate cross-section between said front side and said upper edge such that an outer surface of said lens portion adjacent to said first longitudinal edge lies substantially tangential to said front side of said housing and said outer surface of said lens portion adjacent said second longitudinal edge lies substantially tangential to an outer surface of said upper edge, a clip member having first and second legs extending substantially parallel to each other, and an arcuate portion connecting said first and second legs, pivot means attached to said rear side at said upper portion, said pivot means connecting said clip member to said housing for pivotal movement between two positions in a plane substantially parallel to said rear side at said upper portion, and wherein said clip member may be positioned in a first position extending substantially adjacent to said upper portion whereby said clip member may support said transmitter on a belt, and said clip may be positioned in a second position extending substantially adjacent to said lower portion whereby said clip operates as a support leg for cooperating with said lower edge to support said transmitter on a horizontal surface with said upper portion in a substantially vertical position.

13. A receiver for use in monitoring a baby, said receiver comprising:

a housing defining upper and lower edges, an elongated clip having opposing first and second ends, a connection point connecting said first end of said clip to said housing, and wherein said clip is movable relative to said housing between a first position where said clip extends in an upward direction from said connection point with said second end adjacent to said upper edge of said housing, and a second position where said clip extends in a downward direction from said connection point opposite from said upward direction.

14. The receiver of claim 13 wherein said clip includes a first leg located adjacent to said housing attached to said connection point and a second leg connected to said first leg at a location on said first leg distal from said connection point.

15. The receiver of claim 13 wherein said connection point defines a pivot axis extending in a direction away from said housing and passing through said clip, said clip pivoting about said pivot axis during movement between said first and second positions.

16. The receiver of claim 13 wherein said second end of said clip moves through approximately 180° of movement in moving from said first to said second position.

17. The receiver of claim 13 including means for positively locating said clip in said first and second positions whereby movement of said clip out of each of said first and second positions is inhibited.

* * * * *